US010500497B2

(12) United States Patent
Scott et al.

(10) Patent No.: US 10,500,497 B2
(45) Date of Patent: *Dec. 10, 2019

(54) TRANSFER OF ATTRIBUTES BETWEEN GENERATIONS OF CHARACTERS

(71) Applicant: Microsoft Technology Licensing, LLC, Redmond, WA (US)

(72) Inventors: James William Scott, Cambridge (GB); Haiyan Zhang, Cambridge (GB); Nicolas Villar, Cambridge (GB); Alexandra Keeley Bunting, London (GB); Jonathan Leslie Venables, Cambridge (GB); Simon Jay Carter, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,146

(22) Filed: Apr. 28, 2017

(65) Prior Publication Data
US 2017/0232347 A1 Aug. 17, 2017

Related U.S. Application Data

(63) Continuation of application No. 14/509,940, filed on Oct. 8, 2014, now Pat. No. 9,696,757.

(51) Int. Cl.
*A63F 13/58* (2014.01)
*A63F 13/24* (2014.01)
(Continued)

(52) U.S. Cl.
CPC .............. *A63F 13/58* (2014.09); *A63F 13/21* (2014.09); *A63F 13/24* (2014.09); *A63F 13/25* (2014.09);
(Continued)

(58) Field of Classification Search
CPC ... A63F 2300/1062; A63F 13/24; G06F 1/163
See application file for complete search history.

(56) References Cited

U.S. PATENT DOCUMENTS 4,445,187 A 4/1984 Best
5,474,457 A 12/1995 Bromley
(Continued)

FOREIGN PATENT DOCUMENTS

CN 1584838 A 2/2005
CN 101207640 A 6/2008
(Continued)

OTHER PUBLICATIONS

U.S. Appl. No. 14/203,991, Zhang, et al., "Generation of Custom Modular Objects", filed Mar. 11, 2014.
(Continued)

*Primary Examiner* — Jitesh Patel
(74) *Attorney, Agent, or Firm* — Ray Quinney & Nebeker P.C.; John Carpenter (57) ABSTRACT

A system in which attributes are transferred between generations of characters in an interactive software experience is described. In an embodiment, data identifying one or more hardware attributes for a virtual entity are determined based on a physical user device associated with that virtual entity. One or more virtual attributes for the virtual entity are accessed and one or more behaviors of the virtual entity within the interactive software experience are modified based on a combination of the hardware and virtual attributes.

17 Claims, 5 Drawing Sheets (51) Int. Cl.
*A63F 13/21* (2014.01)
*A63F 13/25* (2014.01)
*A63F 13/30* (2014.01)
*G06T 19/20* (2011.01)
*G06F 1/16* (2006.01)
*G06N 3/00* (2006.01)
*A63F 13/212* (2014.01)

(52) U.S. Cl.
CPC ............ *A63F 13/30* (2014.09); *G06F 1/163* (2013.01); *G06N 3/006* (2013.01); *G06T 19/20* (2013.01); *A63F 13/212* (2014.09); *A63F 2300/8082* (2013.01); *G06T 2219/024* (2013.01)

(56) References Cited

U.S. PATENT DOCUMENTS

| | | | |
|---|---|---|---|
| 5,853,327 A | 12/1998 | Gilboa | |
| 6,031,549 A * | 2/2000 | Hayes-Roth | G06T 13/40 345/474 |
| 6,149,490 A | 11/2000 | Hampton et al. | |
| 6,159,101 A | 12/2000 | Simpson | |
| 6,290,565 B1 | 9/2001 | Galyean, III et al. | |
| 6,305,688 B1 | 10/2001 | Waroway | |
| 6,454,624 B1 | 9/2002 | Duff et al. | |
| 6,572,431 B1 | 6/2003 | Maa | |
| 6,575,802 B2 | 6/2003 | Yim et al. | |
| 6,629,591 B1 | 10/2003 | Griswold et al. | |
| 6,682,392 B2 | 1/2004 | Chan | |
| 6,773,322 B2 | 8/2004 | Gabai et al. | |
| 6,773,344 B1 | 8/2004 | Gabai et al. | |
| 6,877,096 B1 | 4/2005 | Chung et al. | |
| 6,923,717 B2 * | 8/2005 | Mayer | A63F 13/10 463/23 |
| 6,954,659 B2 | 10/2005 | Tushinsky et al. | |
| 7,154,363 B2 | 12/2006 | Hunts | |
| 7,403,202 B1 | 7/2008 | Nash | |
| 7,439,972 B2 | 10/2008 | Timcenko | |
| 7,568,963 B1 | 8/2009 | Atsmon et al. | |
| 7,641,476 B2 | 1/2010 | Didur et al. | |
| 7,695,338 B2 | 4/2010 | Dooley et al. | |
| 7,749,089 B1 | 7/2010 | Briggs et al. | |
| 8,058,837 B2 | 11/2011 | Beers et al. | |
| 8,079,846 B1 | 12/2011 | Cookson | |
| 8,087,939 B2 | 1/2012 | Rohrbach et al. | |
| 8,157,611 B2 | 4/2012 | Zheng | |
| 8,228,202 B2 | 7/2012 | Buchner et al. | |
| 8,257,157 B2 | 9/2012 | Polchin | |
| 8,292,688 B2 | 10/2012 | Ganz | |
| 8,317,566 B2 | 11/2012 | Ganz | |
| 8,332,544 B1 | 12/2012 | Ralls et al. | |
| 8,475,275 B2 | 7/2013 | Weston et al. | |
| 8,548,819 B2 | 10/2013 | Chan et al. | |
| 8,585,476 B2 | 11/2013 | Mullen | |
| 8,628,414 B2 | 1/2014 | Walker et al. | |
| 8,825,187 B1 | 9/2014 | Hamrick et al. | |
| 8,854,925 B1 | 10/2014 | Lee et al. | |
| 8,864,497 B1 | 10/2014 | Pollak et al. | |
| 8,864,589 B2 | 10/2014 | Reiche, III | |
| 8,894,459 B2 | 11/2014 | Leyland et al. | |
| 8,894,462 B2 | 11/2014 | Leyland et al. | |
| 9,008,310 B2 | 4/2015 | Nelson et al. | |
| 9,180,378 B2 | 11/2015 | Reiche | |
| 9,339,729 B2 | 5/2016 | Heatherly et al. | |
| 9,387,407 B2 | 7/2016 | Vignocchi et al. | |
| 9,409,084 B2 | 8/2016 | Horovitz et al. | |
| 9,919,226 B2 | 3/2018 | Scott et al. | |
| 2002/0053089 A1 | 5/2002 | Massey | |
| 2002/0081937 A1 | 6/2002 | Yamada et al. | |
| 2002/0082063 A1 | 6/2002 | Miyaki et al. | |
| 2002/0196250 A1 | 12/2002 | Anderson et al. | |
| 2003/0013524 A1 * | 1/2003 | Cochran | A63F 13/04 463/37 |
| 2003/0030595 A1 * | 2/2003 | Radley-Smith | A44C 5/0007 345/1.3 |
| 2003/0232649 A1 | 12/2003 | Gizis et al. | |
| 2004/0053690 A1 * | 3/2004 | Fogel | A63F 13/12 463/31 |
| 2005/0049725 A1 | 3/2005 | Huang | |
| 2005/0132290 A1 | 6/2005 | Buchner et al. | |
| 2005/0227811 A1 | 10/2005 | Shum et al. | |
| 2005/0245302 A1 | 11/2005 | Bathiche et al. | |
| 2005/0255916 A1 * | 11/2005 | Chen | A63F 13/06 463/37 |
| 2006/0058018 A1 | 3/2006 | Toulis et al. | |
| 2006/0223637 A1 | 10/2006 | Rosenberg | |
| 2007/0097832 A1 | 5/2007 | Koivisto et al. | |
| 2007/0155505 A1 | 7/2007 | Huomo | |
| 2007/0188444 A1 | 8/2007 | Vale et al. | |
| 2007/0198117 A1 | 8/2007 | Wajihuddin | |
| 2007/0218988 A1 | 9/2007 | Lucich | |
| 2007/0279852 A1 | 12/2007 | Daniel et al. | |
| 2007/0293319 A1 * | 12/2007 | Stamper | A63F 13/12 463/42 |
| 2008/0014835 A1 * | 1/2008 | Weston | A63H 30/04 446/484 |
| 2008/0045283 A1 * | 2/2008 | Stamper | A63F 13/10 463/1 |
| 2008/0076519 A1 * | 3/2008 | Chim | G07F 17/32 463/20 |
| 2008/0085773 A1 | 4/2008 | Wood | |
| 2008/0153559 A1 | 6/2008 | De Weerd | |
| 2008/0280684 A1 * | 11/2008 | McBride | A63F 13/12 463/42 |
| 2009/0008875 A1 | 1/2009 | Wu et al. | |
| 2009/0029771 A1 | 1/2009 | Donahue | |
| 2009/0047865 A1 | 2/2009 | Nakano | |
| 2009/0048009 A1 * | 2/2009 | Brekelmans | A63F 13/10 463/4 |
| 2009/0053970 A1 | 2/2009 | Borge | |
| 2009/0081923 A1 | 3/2009 | Dooley et al. | |
| 2009/0082879 A1 * | 3/2009 | Dooley | B25J 9/1658 700/3 |
| 2009/0094287 A1 * | 4/2009 | Johnson | G06Q 10/08 |
| 2009/0104988 A1 | 4/2009 | Enge et al. | |
| 2009/0206548 A1 | 8/2009 | Hawkins et al. | |
| 2009/0251419 A1 | 10/2009 | Radely-Smith | |
| 2009/0265642 A1 | 10/2009 | Carter et al. | |
| 2009/0273560 A1 | 11/2009 | Kalanithi et al. | |
| 2009/0291764 A1 | 11/2009 | Kirkman et al. | |
| 2009/0307592 A1 | 12/2009 | Kalanithi et al. | |
| 2009/0315839 A1 | 12/2009 | Wilson et al. | |
| 2010/0009747 A1 * | 1/2010 | Reville | A63F 13/12 463/31 |
| 2010/0026698 A1 * | 2/2010 | Reville | A63F 13/10 345/581 |
| 2010/0035726 A1 | 2/2010 | Fisher et al. | |
| 2010/0103075 A1 | 4/2010 | Kalaboukis et al. | |
| 2010/0113148 A1 | 5/2010 | Haltovsky et al. | |
| 2010/0144436 A1 * | 6/2010 | Marks | G06F 3/017 463/36 |
| 2010/0167623 A1 | 7/2010 | Eyzaguirre et al. | |
| 2010/0274902 A1 | 10/2010 | Penman et al. | |
| 2010/0279823 A1 | 11/2010 | Waters | |
| 2010/0311504 A1 | 12/2010 | Deegan | |
| 2010/0331083 A1 | 12/2010 | Maharbiz et al. | |
| 2011/0021109 A1 | 1/2011 | Le et al. | |
| 2011/0028219 A1 | 2/2011 | Heatherly et al. | |
| 2011/0172015 A1 * | 7/2011 | Ikeda | A63F 13/06 463/37 |
| 2011/0215998 A1 | 9/2011 | Fitzgerald et al. | |
| 2011/0239143 A1 * | 9/2011 | Ye | G06F 3/048 715/764 |
| 2012/0007817 A1 | 1/2012 | Heatherly et al. | |
| 2012/0050198 A1 | 3/2012 | Cannon | |
| 2012/0052931 A1 | 3/2012 | Jaqua et al. | |
| 2012/0052934 A1 | 3/2012 | Maharbiz et al. | |
| 2012/0084467 A1 | 4/2012 | Birnbaum et al. | |
| 2012/0122059 A1 | 5/2012 | Schweikardt et al. | |
| 2012/0190453 A1 | 7/2012 | Skaff et al. | |
| 2012/0190456 A1 | 7/2012 | Rogers | |

(56) References Cited

U.S. PATENT DOCUMENTS

| | | | |
|---|---|---|---|
| 2012/0268360 A1* | 10/2012 | Mikhailov | A63F 13/06 345/156 |
| 2012/0286629 A1 | 11/2012 | Johnson et al. | |
| 2012/0295700 A1 | 11/2012 | Reiche | |
| 2012/0295704 A1 | 11/2012 | Reiche et al. | |
| 2013/0109267 A1 | 5/2013 | Schweikardt et al. | |
| 2013/0109272 A1 | 5/2013 | Rindlisbacher | |
| 2013/0122753 A1 | 5/2013 | Blakborn | |
| 2013/0157477 A1 | 6/2013 | McCormack | |
| 2013/0165223 A1 | 6/2013 | Leyland et al. | |
| 2013/0173658 A1 | 7/2013 | Adelman et al. | |
| 2013/0196766 A1 | 8/2013 | Leyland et al. | |
| 2013/0196770 A1 | 8/2013 | Barney et al. | |
| 2013/0231193 A1 | 9/2013 | Heatherly et al. | |
| 2013/0271390 A1* | 10/2013 | Lyons | G04G 17/083 345/173 |
| 2013/0288563 A1 | 10/2013 | Zheng et al. | |
| 2013/0324239 A1* | 12/2013 | Ur | A63F 13/57 463/31 |
| 2013/0324250 A1 | 12/2013 | Sofman et al. | |
| 2014/0002580 A1 | 1/2014 | Bear et al. | |
| 2014/0011595 A1 | 1/2014 | Muller | |
| 2014/0055352 A1 | 2/2014 | Davis et al. | |
| 2014/0141865 A1 | 5/2014 | Tropper et al. | |
| 2014/0181820 A1 | 6/2014 | Vignocchi et al. | |
| 2014/0213357 A1 | 7/2014 | Claffey | |
| 2014/0235198 A1 | 8/2014 | Lee et al. | |
| 2014/0235353 A1* | 8/2014 | Witchey | A63F 9/24 463/42 |
| 2014/0273717 A1 | 9/2014 | Judkins et al. | |
| 2015/0042619 A1 | 2/2015 | Forti et al. | |
| 2015/0080121 A1 | 3/2015 | Garlington et al. | |
| 2015/0209664 A1 | 7/2015 | Haseltine | |
| 2015/0242612 A1 | 8/2015 | Moberg et al. | |
| 2015/0258440 A1 | 9/2015 | Zhang et al. | |
| 2015/0258459 A1 | 9/2015 | Scott et al. | |
| 2015/0268717 A1 | 9/2015 | Schlumberger et al. | |
| 2015/0375114 A1 | 12/2015 | Scott et al. | |
| 2015/0375115 A1 | 12/2015 | Bunting et al. | |
| 2015/0375128 A1 | 12/2015 | Villar et al. | |
| 2015/0375134 A1 | 12/2015 | Zhang et al. | |
| 2016/0051904 A1 | 2/2016 | Abir | |
| 2016/0101361 A1 | 4/2016 | Scott et al. | |
| 2016/0101364 A1 | 4/2016 | Scott et al. | |
| 2016/0104321 A1 | 4/2016 | Scott et al. | |

FOREIGN PATENT DOCUMENTS

| | | |
|---|---|---|
| CN | 103096987 A | 5/2013 |
| CN | 103236720 A | 8/2013 |
| CN | 103443743 A | 12/2013 |
| CN | 103530495 A | 1/2014 |
| CN | 203434701 U | 2/2014 |
| CN | 103999012 A | 8/2014 |
| EP | 1444662 A2 | 8/2004 |
| JP | S5429063 B2 | 9/1979 |
| JP | H09205733 A | 8/1997 |
| JP | 2003038842 A | 2/2003 |
| JP | 2011-036418 | 2/2011 |
| JP | 2013135374 A | 7/2013 |
| WO | WO2001012285 A1 | 2/2001 |
| WO | WO2001069829 A2 | 9/2001 |
| WO | WO20010069799 A2 | 9/2001 |
| WO | 03027970 A2 | 4/2003 |
| WO | WO2009037679 A1 | 3/2009 |
| WO | WO 2011/112498 | 9/2011 |
| WO | 2012162090 A2 | 11/2012 |
| WO | WO2012160055 A1 | 11/2012 |
| WO | 2014055924 A1 | 4/2014 |
| WO | WO 2015/138267 | 9/2015 |

OTHER PUBLICATIONS

U.S. Appl. No. 14/204,239, Zhang, et al., "Gaming System for Modular Toys", filed Mar. 11, 2014.

U.S. Appl. No. 14/204,483, Saul, et al., "Interactive Smart Beads", filed Mar. 11, 2014.

U.S. Appl. No. 14/204,740, Saul, et al., "A Modular Construction for Interacting with Software", filed Mar. 11, 2014.

U.S. Appl. No. 14/204,929, Zhang, et al., "Storing State for Physical Modular Toys", filed Mar. 11, 2014.

U.S. Appl. No. 14/205,077, Zhang, et al., "Data Store fora Modular Assembly System", filed Mar. 11, 2014.

Ahde, et al., "Hello—Bracelets Communicating Nearby Presence of Friends", In Proceedings of the Tenth Anniversary Conference on Participatory Design, Sep. 30, 2008, 3 pages.

Betters, Elyse, "LeapFrog LeapBand is an Activity Band for Kids with Virtual Pet Capabilities", Published on: May 1, 2014, Available at: https://uk.news.yahoo.com/leapfrog-leapband-activity-band-kids-virtual-pet-capabilities-231500937.htm l#PQ8QOQq.

Construkts—Part time UI/UX and Engineer Positions, 2014 Available at: http://www.construkts.com.

"Cubelets", Sep. 11, 2013, Available at: http://www.modrobotics.com/.

'Cuff—fashion wearable bracelets', 2014 Available at: http://www.elle.com/_mobile/news/fashion-accessories/cufflinc-wearable-techsrc=spr_TWITTER&spUd= 1448_51714286&linkId= 7882609.

"Disney Infinity", Nov. 19, 2013, Available at: https://infinity.disney.com/en-gb.

"Disney Infinity", Published on: Aug. 25, 2013, Available at: http://www.essentialkids.com.au/entertaining-kids/games-and-technology/disney-infinity-20130823-2sgg0.html.

Fortmann, et al., "Iliumee: Aesthetic Light Bracelet as a Wearable Information Display for Everyday Life", In Proceedings of ACM Conference on Pervasive and Ubiquitous Computing Adjunct Publication, Sep. 8, 2013, 4 pages.

Jennings, et al., "CONSTRUCTNizM: A Framework for Rendering Tangible constructions", In Proceedings of the 14th Congress of the Iberoamerican Society of Digital Graphics, Nov. 17, 2010, 4 pages.

Kelly, Samantha Murphy, "The Reinvented Tamagotchi: Bright, Flashy and Just as Needy", Feb. 20, 2014, Available at: http://mashable.com/2014/02/20/tamagotchi-friends/.

Kikin-Gil, Ruth, "BuddyBeads", Published on: Oct. 10, 2006, Available at: http://www.ruthkikin.com/Images/r.kikin-giUhesis2005.pdf.

Kitamura, et al., "Real-time 3D Interaction with ActiveCube", In Proceedings of Extended Abstracts on Human Factors in Computing Systems, Mar. 31, 2001, 2 pages.

Kuniavsky, Mike, "Smart Things: Ubiquitous Computing User Experience Design", Published on: Sep. 2010, Available at: http://books.google.co.in/books?id=-WLyUCBBUVAC&pg=PA89&lpg=PA89&dq=Interactive+Smart+Beads+andBracelet&source=bl&ots=HA6ZA 1 Bssz&sig=x1 s2X1pGZle-50VqX3uZAOjZ1ks&hl=en&sa=X&ei=BxWLUqSG14X3rOfh90DYCg&ved=OCFA06AEwBg#V=onepage&q=Interactive%20Smart%20Beads%20and%20Bracelet&f=false.

Labrune, et al., "Telebeads: Social Network Mnemonics for Teenagers", In Proceedings of Conference on Interaction Design and Children, Jun. 7, 2006, 8 pages.

Lampe, et al., "Integrating Interactive Learning Experiences into Augmented Toy Environments", In Proceedings of the Pervasive Learning Workshop at the Pervasive Conference, May 2007, 8 pages.

Lampe, et al., "The Augmented Knight's Castle—Integrating Mobile and Pervasive Computing Technologies into Traditional Toy Environments", Nov. 21, 2013, Available at: http://www.vs.inl.ethz.ch/publ/papers/mlampe-pg07-akc.pdf.

Marshall, Rick, "Skylanders: Swap Force Review" Published on: Nov. 1, 2013, Available at: http://www.digitaltrends.com/game-reviews/skylanders-swap-force-review/.

(56) References Cited

OTHER PUBLICATIONS

Office Action for U.S. Appl. No. 14/509,940, dated Oct. 6, 2016, Scott et al., "Transfer of Attributes between Generation of Characters", 24 Pages.
Patrizia, et al., "A Robotic Toy for Children with special needs: From requirements to Design", In IEEE 11th International Conference on Rehabilitation Robotics, Nov. 20, 2013, 6 pages.
Persson, Markus, "Minecraft", May 27, 2014, Available at: https://minecraft.nel/game.
'Prodigy—Kickstarter', 2014 Available at: https/lwww.kickstarter.com/projects/121511 007/prod igy-the-game.
"Proxi In-Device Charging Solution", Retrieved on: May 19, 2013, Available at: http://powerbyproxi.com/consumer-electronics/industrial/proxi-in-device-charging-solutionl.
Raffle, et al., "Topobo: A Constructive Assembly System with Kinetic Memory", In Proceedings of the SIGCHI Conference on Human Factors in Computing Systems, Apr. 24, 2004.
Robertson, Judy, "Encouraging Girls to Study Geeky Subjects (Part 2): Programmable Bracelets", Published on: Apr. 12, 2010, Available at: http://cacm.acm.org/blogs/blog-cacm/85132-encouraging-girls-to-study-geeky-subjects-part-2-programmablebracelets/fulltext.
Schmid, et al., "Networking Smart Toys with Wireless ToyBridge and ToyTalk", In IEEE International Conference on Computer Communications, Apr. 10, 2011, 2 pages.
Schweikardt, Eric, "Designing Modular Robots", Nov. 19, 2013, Available at: <<http://www.cmu.edu/architecture/research/grad_workl2009_phdcd_schweikardt_eric.pdf>>.
"Seebo Platform", Published on: Jun. 22, 2013, Available at: http://www.seebo.com/.
"Shapeways", Nov. 19, 2013, Available at: http://shapeways.com/.
"Siftables are Changing the Shape of Computing", Published on: May 9, 2010, Available at: http://singularityhub.com/20 1 0/05/05/siftables-are-changing-the-shape-of-computing/.
"Skylanders Swapforce", Sep. 11, 2013, Available at: http://www.skylanders.com/swapforce.
Webster, Andrew, "Nex Band is a Smart, Modular Charm Bracelet for Gaming on Your Wrist", Published on: Feb. 13, 2014, Available at: http://www.theverge. com/20 14/2/13/5289404/nex-band-is-a-smart-modu lar -charm-bracelet.
"World of War craft "Crafting" Skills", May 27,2014, Available at: http://us.battle.nel/wow/en/.
Wu, Yingying, "Customizable Wristband Sensor for Healthcare Monitoring 2411", Published on: Nov. 14, 2013, Available at: http://marblar.com/idea/49307.
Zaino, Jennifer, "JNFC Technology Brings New Life to Games", In Journal of RFID, Oct. 1, 2012, 10 pages.
Final Office Action dated Mar. 9, 2016, from U.S. Appl. No. 14/204,929, 7 pp.
Final Office Action dated Dec. 1, 2016, from U.S. Appl. No. 14/320,399, 9 pp.
Final Office Action dated Apr. 20, 2017, from U.S. Appl. No. 14/318,945, 9 pp.
Final Office Action dated May 19, 2017, from U.S. Appl. No. 14/319,628, 15 pp.
Final Office Action dated Jan. 26, 2018, from U.S. Appl. No. 14/320,399, 9 pp.
Final Office Action dated Mar. 7, 2018, from U.S. Appl. No. 14/320,154, 20 pp.
Final Office Acton dated Sep. 5, 2018, from U.S. Appl. No. 14/318,945, 10 pp.
Gilpin et al., "Robot Pebbles: One Centimeter Modules for Programmable Matter through Self-Disassembly," *IEEE Int'l Conf. on Robotics and Automation*, 8 pp. (May 2010).
Hunter et al., "Make a Riddle and Telestory: Designing Children's Applications for the Siftables Platform," *Int'l Conf. on Interaction Design and Children*, 4 pp. (Jun. 2010).
International Preliminary Report on Patentability dated Jun. 28, 2016, from International Patent Application No. PCT/US2015/038218, 7 pp.
International Preliminary Report on Patentability dated Jul. 21, 2016, from International Patent Application No. PCT/US2015/054103, 5 pp.
International Preliminary Report on Patentability dated Sep. 23, 2016, from International Patent Application No. PCT/US2015/038215, 10 pp.
International Preliminary Report on Patentability dated Sep. 23, 2016, from International Patent Application No. PCT/US2015/038216, 9 pp.
International Preliminary Report on Patentability dated Oct. 18, 2016, from International Patent Application No. PCT/US2015/038217, 10 pp.
International Search Report and Written Opinion dated Sep. 17, 2015, from International Patent Application No. PCT/US2015/038218, 10 pp.
International Search Report and Written Opinion dated Sep. 30, 2015, from International Patent Application No. PCT/US2015/038217, 11 pp.
International Search Report and Written Opinion dated Oct. 8, 2015, from International Patent Application No. PCT/US2015/038215, 11 pp.
International Search Report and Written Opinion dated Oct. 9, 2015, from International Patent Application No. PCT/US2015/038216, 13 pp.
International Search Report and Written Opinion dated Feb. 1, 2016, from International Patent Application No. PCT/US2015/054103, 12 pp.
Office Action dated Sep. 23, 2015, from U.S. Appl. No. 14/204,929, 9 pp.
Office Action dated Jul. 1, 2016, from U.S. Appl. No. 14/320,399, 8 pp.
Office Action dated Aug. 12, 2016, from U.S. Appl. No. 14/320,154, 11 pp.
Office Action dated Sep. 12, 2016, from U.S. Appl. No. 14/318,945, 10 pp.
Office Action dated Oct. 21, 2016, from U.S. Appl. No. 14/319,628, 16 pp.
Office Action dated Apr. 6, 2017, from U.S. Appl. No. 14/509,862, 15 pp.
Office Action dated May 10, 2017, from U.S. Appl. No. 14/320,154, 14 pp.
Office Action dated May 18, 2017, from U.S. Appl. No. 14/320,399, 9 pp.
Office Action dated Nov. 28, 2017, from U.S. Appl. No. 14/318,945, 10 pp.
Office Action dated Dec. 14, 2017, from U.S. Appl. No. 14/319,628, 20 pp.
Office Action dated Jun. 13, 2018, from U.S. Appl. No. 14/509,919, 18 pp.
Office Action dated Sep. 6, 2018, from U.S. Appl. No. 14/320,399, 10 pp.
Office Action dated Sep. 24, 2018, from U.S. Appl. No. 14/320,154, 11 pp.
Pogue, "Tiny Screens Bearing Tiny Delights," downloaded from: http://www.nytimes.com/2011/08/11/technology/interactive-cubes-recall-games-of-the-past-state-of-the-art.html, 4 pp. (Aug. 11, 2011).
"Prodigy," downloaded from: https://www.kickstarter.com/projects/hanakai/prodigy-the-game/updates, 15 pp. (downloaded on: Dec. 9, 2017).
"Tamagotchi," downloaded from: https://en.wikipedia.org/wiki/Tamagotchi, 7 pp. (downloaded on: May 15, 2017).
"TeleStory by Seth Hunter and David Merrill on Vimeo," downloaded from: https://vimeo.com/11796358, 4 pp. (downloaded on: Jul. 19, 2016).
Written Opinion dated Jun. 8, 2016, from International Patent Application No. PCT/US2015/038217, 8 pp.
Written Opinion dated Jun. 10, 2016, from International Patent Application No. PCT/US2015/038216, 8 pp.
Written Opinion dated Jun. 10, 2016, from International Patent Application No. PCT/US2015/038215, 9 pp.
"Final Office Action Issued in U.S. Appl. No. 14/509,919", dated Jan. 2, 2019, 18 Pages.

(56) References Cited

OTHER PUBLICATIONS

"First Office Action and Search Report Issued in Chinese Patent Application No. 201580036030.0", dated Jan. 31, 2019, 16 Pages.
"Office Action Issued in European Patent Application No. 15782188.5", dated Feb. 14, 2019, 4 Pages.
"First Office Action and Search Report Issued in Chinese Patent Application No. 201580036018.X", dated Jan. 23, 2019, 28 Pages.
"Non Final Office Action Issued in U.S. Appl. No. 14/318,945", dated Apr. 4, 2019, 6 Pages.
"Non Final Office Action Issued in U.S. Appl. No. 14/319,628", dated Mar. 21, 2019, 16 Pages.
"First office action and Search Report Issued in Chinese Patent Application No. 201580054924.2", dated May 24, 2019, 13 Pages.
"Second Office Action Issued in Chinese Patent Application No. 201580036030.0", dated Jun. 18, 2019, 23 Pages.
"Second Office Action Issued in Chinese Patent Application No. 201580036018.X", dated Jul. 16, 2019, 69 Pages.
"Second Office Action Issued in Chinese Patent Application No. 201580054924.2", dated Aug. 9, 2019, 9 Pages.
"Third Office Action Issued in Chinese Patent Application No. 201580054924.2", dated Sep. 20, 2019, 7 Pages.
"Office Action Issued in Japanese Patent Application No. 2017-518972", dated Sep. 24, 2019, 9 Pages.

\* cited by examiner

TRANSFER OF ATTRIBUTES BETWEEN GENERATIONS OF CHARACTERS

RELATED APPLICATIONS

This application claims priority to, and is a continuation of, U.S. patent application Ser. No. 14/509,940, filed on Oct. 8, 2014, which is hereby incorporated by reference.

BACKGROUND

There are many ways that a user can interact with a computer game and typically a user controls the game via a keyboard and mouse, games controller (which may be handheld or detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled.

The embodiments described below are not limited to implementations which solve any or all of the disadvantages of known methods of interacting with software.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A system in which attributes are transferred between generations of characters in an interactive software experience is described. In an embodiment, data identifying one or more hardware attributes for a virtual entity are received from a physical user device associated with that virtual entity. One or more virtual attributes for the virtual entity are also accessed and one or more behaviors of the virtual entity within the interactive software experience are modified based on a combination of the hardware and virtual attributes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Methods and apparatus (e.g. hardware) for transferring attributes between generations of virtual entities (e.g. virtual characters, virtual objects, etc.) are described below. As described in more detail below, the behavior of a virtual entity within an interactive software experience (such as a computer game) is at least partially dependent upon a set of attributes associated with the virtual entity. The set of attributes comprises two subsets: virtual attributes which are managed within the interactive software experience and hardware attributes which are associated with a physical user device, such as a wearable device or other hardware token (e.g. a game piece). The physical user device stores data which identifies the hardware attributes, where this data may be the hardware attributes themselves or an identifier for the hardware attributes which may be stored elsewhere (e.g. in a remote computing device). The virtual attributes relate to the particular virtual entity and are not transferred between generations of virtual entities whilst the hardware attributes are associated with the physical user device and affect any virtual entity that is associated with the physical user device. Consequently, at least some of the hardware attributes (or some aspects of the hardware attributes) are transferred between generations of virtual entities which are associated with the same physical user device. It will be appreciated that in addition to the two subsets described, there may also be other attributes of the virtual entity (e.g. fixed digital attributes which are implemented by the designer of the interactive software experience, more persistent virtual attributes, temporary attributes stored in the physical user device, etc.).

The virtual entity is a digital representation of an entity which may, for example, be a character or object. The virtual entity may resemble a real world object (e.g. a person, a real world vehicle, etc.) or a fictional entity (e.g. an alien, elf, monster, fantasy vehicle, etc.).

The interactive software experience may be a game, social media application, personal organization application (e.g. which enables one or more users to set out a family/work schedule through physical tokens in the form of modules which represent particular tasks), multimedia application (e.g. which allows a user to compose photographs and music represented by physical tokens in the form of modules into a slideshow/movie for sharing), etc.

Although many of the present examples are described and illustrated as being implemented in a system comprising a wearable device, the system described is provided as an example and not a limitation. As those skilled in the art will appreciate, the present examples are suitable for application in a variety of different types of systems comprising physical user devices and in other examples, the physical user device may be a form of hardware token other than a wearable device (e.g. a game piece, a non-wearable fashion item such as a phone charm), an appliance, a robot, a piece of sports equipment, etc.). For example, where the physical user device is an appliance, the virtual entity may be a "personality" for that appliance and where the physical user device is a piece of sports equipment, the virtual entity may be a coach function.

Figure 1:
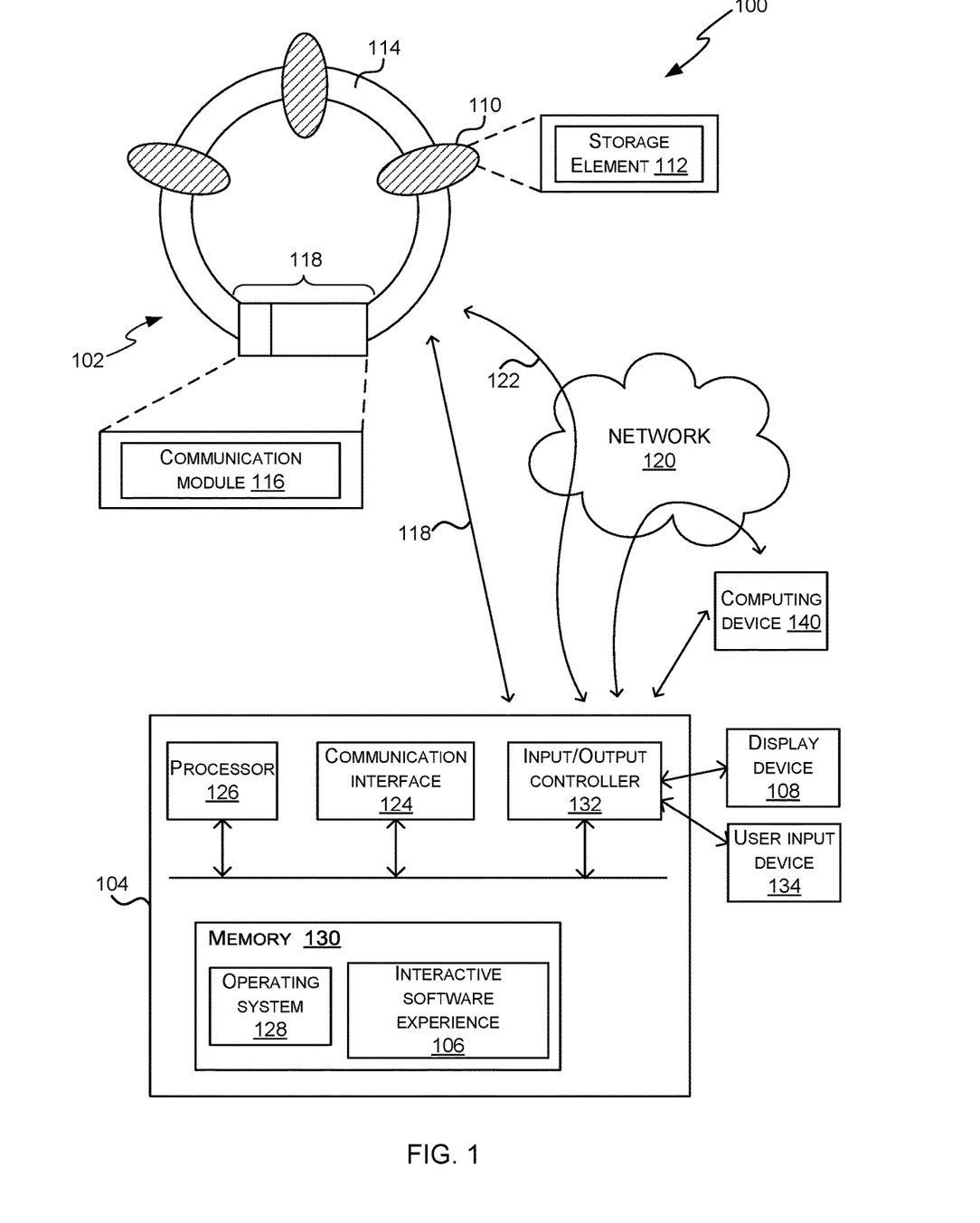
FIG. 1 is a schematic diagram of a system comprising a wearable device and a computing device on which an interactive software experience runs.

FIG. 1 is a schematic diagram of a system 100 comprising a wearable device 102 and a computing device 104 on which an interactive software experience 106 runs. The interactive software experience 106 provides a graphical user interface (GUI) which is rendered on or by a display device 108 (e.g. a display screen or a projector) which may be integral to or separate from the computing device 104. In various examples where the display device 108 is not integrated within the computing device 104, the display device 108 may be a peripheral device connected to the computing device 102. In other examples, however, the display device 108 may be integrated within or connected to another computing device (not shown in FIG. 1), e.g. the computing device 102 may be located in a data center or other location remote from the user and the display device 108 may be integral to or connected to a computing device used by the user (e.g. a smart phone, desktop, laptop or tablet computer, games console, smart TV, etc.). Hence, irrespective of where the computing device 104 is located, a user can view the GUI of the interactive software experience 106.

The wearable device 102 or a part thereof (e.g. smart bead 110) is associated with a virtual entity within the interactive software experience (where the virtual entity may be a character, object, etc.) and comprises a storage element 112 which is arranged to store data identifying one or more hardware attributes for the associated virtual entity. As is described in more detail below, the hardware attributes may be fixed (i.e. such that they cannot be changed) or may change slowly/infrequently such that the attributes can continue to be used after the virtual entity is no longer associated with the particular wearable device 102 or part thereof (e.g. when the virtual entity comes to the end of its virtual life or is associated with a different physical user device or otherwise "leaves" the wearable device 102).

The wearable device 102 shown in FIG. 1 comprises one or more smart beads 110 and a band (or connecting element) 114 to which the smart beads can be attached. The term 'smart bead' is used herein to refer to an object which can be attached to (e.g. snapped, clipped or threaded onto) a connecting element (e.g. to form a bracelet or necklace) and which comprises a storage element 110 arranged to store data relating to the bead (such as an ID for the bead). For the purpose of the following discussion (and by way of example only), it is assumed that a smart bead 110 is associated with a virtual entity within the interactive software experience 106; however it will be appreciated that in other examples, the entire wearable device 102 (rather than a part thereof) may be associated with the virtual entity.

As described in more detail below, the interactive software experience 106 uses the hardware attributes which are identified using data stored in the wearable device 102 (i.e. in storage element 112 in smart bead 110), where the data may be the attributes themselves or an identifier for the attributes (where this identifier may be the ID of the bead). In order that the interactive software experience 106 can read the stored data (and potentially update that data, where the data comprises the hardware attributes themselves), the wearable device 102 comprises a communication module 116 arranged to communicate with the computing device 104 on which the interactive software experience runs. In the example shown in FIG. 1, the communication module 116 is not located in the smart bead 110 (which is the hardware token that is associated with the virtual entity and comprises the storage element 112) but is instead located within the connecting element 114 (e.g. within the clasp 118 of the connecting element 114). However, in other examples, the communication module 116 may instead be located within the smart bead 110 or within another smart bead on the same connecting element.

Any suitable wireless communication technology may be used by the communication module 116 to communicate with the interactive software experience 106, e.g. Bluetooth®, Bluetooth® Low Energy (BLE), WiFi™ or WiFi™ Direct, NFC, 802.15.4, etc. The communication module 116 may communicate directly with the computing device 104 running the interactive software experience 106 (arrow 118) or may communicate via a network 120 (e.g. a home network or the internet, arrow 122) and/or an intermediary device (e.g. a wireless access point or other computing device).

The computing device 104 which runs the interactive software experience 106 comprises a communication interface 124 which is arranged to receive data from the wearable device 102 (i.e. from communication module 116). Any suitable wired or wireless communication technology may be used by the communication interface 124 to communicate with the communication module 116. Examples of wireless technologies include, but are not limited to, Bluetooth®, BLE, WiFi™ or WiFi™ Direct, NFC, 802.15.4, etc.

The computing device 104 which runs the interactive software experience 106 further comprises one or more processors 126 which may be microprocessors, controllers or any other suitable type of processors for processing computer executable instructions to control the operation of the computing device 104 in order to run the interactive software experience 106. In some examples, for example where a system on a chip architecture is used, the processors 126 may include one or more fixed function blocks (also referred to as accelerators) which implement a part of the method of running the interactive software experience 106 in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 128 or any other suitable platform software may be provided at the computing device to enable application software, such as the interactive software experience 106 to be executed on the device. The computer executable instructions (including the computer executable instructions for the interactive software experience 106) may be provided using any computer-readable media that is accessible by computing device 104. Computer-readable media may include, for example, computer storage media such as memory 130 and communications media. Computer storage media, such as memory 130, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 130) is shown within the computing device 104 it will be appreciated that the storage may be distributed or located remotely and accessed via a network 120 or other communication link (e.g. using communication interface 124).

In examples where the storage element 112 in the smart bead 110 stores an identifier for the hardware attributes, rather than the hardware attributes themselves, the hardware attributes may be stored in the memory 130 within the computing device 104 or alternatively, the communication interface 124 may be used to access hardware attributes stored in a further computing device 140 (e.g. via network 120 or other communication link).

The computing device 104 may also comprise an input/output controller 132 arranged to output display information to a display device 108 which, as described above, may be separate from or integral to the computing device 104. The display information provides the GUI for the interactive software experience. In various examples where the display device 108 is part of (or connected to) a separate computing device (and is not integral to or a peripheral of computing device 104), the display information may alternatively be transmitted via the communication interface 124. The input/output controller 132 may also be arranged to receive and process input from one or more devices, such as a user input device 134 (e.g. a mouse, keyboard, camera, microphone or other sensor). In some examples the user input device 134 may detect voice input, user gestures or other user actions and may provide a natural user interface (NUI). This user input may be used to provide inputs to the interactive software experience 106. In an embodiment the display device 108 may also act as the user input device 134 if it is a touch sensitive display device. The input/output controller 132 may also output data to other devices which are not shown in FIG. 1.

It will be appreciated that inputs to the interactive software experience 106 may also be received via the communication interface 124. For example, where the display device 108 is remote from the computing device 104 and is part of, or connected to, another computing device, inputs may be made by a user via a user input device which is part of, or connected to, that other computing device and the input commands may be communicated from that computing device to the computing device 104 running the interactive software experience 106 via the communication interface 124.

Any of the input/output controller 132, display device 108 and the user input device 134 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Figure 2:
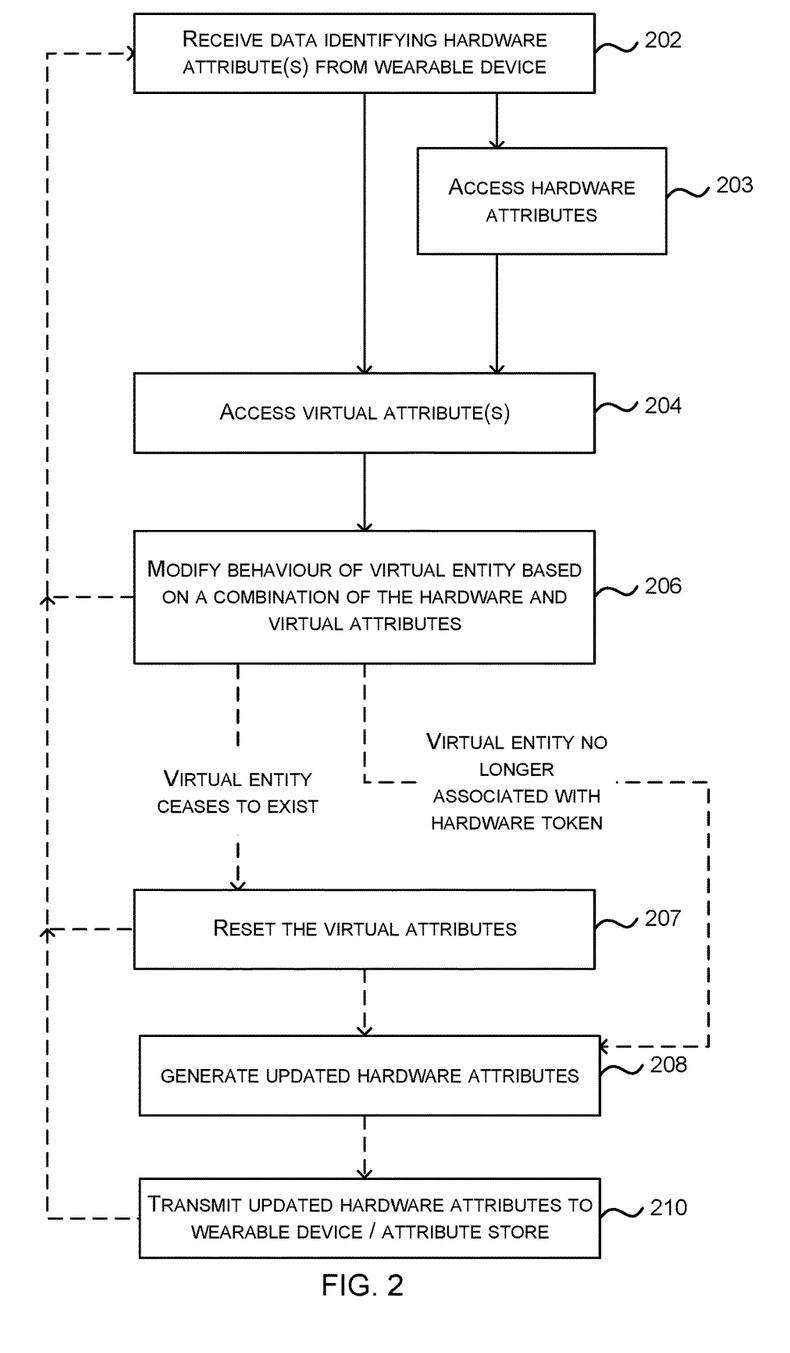
FIG. 2 is a flow diagram of an example method of operation of the interactive software experience.

FIG. 2 is a flow diagram of an example method of operation of the interactive software experience 106. The interactive software experience 106 receives data identifying one or more hardware attributes from a wearable device 102 or part thereof (block 202), e.g. as stored in the storage element 112 within a smart bead 110. The wearable device 102 or part thereof (e.g. smart bead 110) is associated with a virtual entity (e.g. a virtual character) within the interactive software experience 106 and so the hardware attributes received are also associated with the same virtual entity. For the purposes of the following description it is assumed that a smart bead is associated with a virtual entity (rather than the entire wearable device 102); however in other examples, it may be the entire wearable device 102 (rather than a part thereof) that is associated with a virtual entity.

As described above, the data identifying one or more hardware attributes which is received (in block 202) may be the one or more hardware attributes themselves (which may be stored and/or cached on the wearable device) or may be an identifier for one or more hardware attributes which are stored separately from the wearable device (e.g. within the interactive software experience or on a server in a data center). Where an identifier (and not the attributes themselves) is received (in block 202), the interactive software experience 106 accesses the one or more hardware attributes using the data (e.g. the ID) received (block 203).

In addition to receiving/accessing hardware attributes associated with a virtual entity (in block 202 or 203), the interactive software experience accesses one or more virtual attributes associated with the same virtual entity (block 204). These virtual attributes may be accessed from within the interactive software experience 106 or from data storage which is used by the interactive software experience to store virtual variables (e.g. memory 130) or from a separate computing device (e.g. computing device 140) which may be a server in a data center. The interactive software experience 106 modifies the behavior of the virtual entity based on a combination of the hardware and virtual attributes (block 206).

In various examples, the hardware and the virtual attributes for a virtual entity may be non-overlapping and affect different aspects of the behavior of the virtual entity. For example, hardware attribute A may be mapped to behavioral trait A, virtual attribute B may be mapped to behavioral trait B, etc. In other examples, however, there may be some overlap in that more than one attribute may affect the same behavioral trait (e.g. hardware attribute C and virtual attribute C may both affect behavioral trait C) and/or the same attribute may be stored as both a hardware and a virtual attribute and these corresponding attributes may have the same or different values. In the case of any overlap (i.e. where more than one attribute affects the same behavioral trait), the interactive software experience 106 uses predefined rules or algorithms to combine the overlapping attributes to determine how the behavioral trait is modified. In some examples, where a hardware and a virtual attribute overlap, the hardware attribute may override the overlapping virtual attribute, in other examples the overlapping attributes may be combined mathematically (e.g. using addition, subtraction, multiplication, weighted sums, averaging, etc.) or one of them may be selected at random, etc.

Even in cases where there is no overlap, the interactive software experience 106 may use predefined rules or algorithms to determine which of the hardware attributes affect the behavior of the virtual entity. For example, this may mean that there is no guarantee that all the hardware attributes are used.

In some examples, a hardware attribute may be incompatible with a virtual entity in which case the hardware attribute may be ignored when modifying the behavior of the virtual entity or alternatively, an error may be raised which prevents the smart bead 110 from remaining associated with the virtual entity (e.g. it breaks the association between the smart bead 110 and the virtual entity). For example, where the smart bead is an "elf bead" it may not be possible (as a result of incompatible hardware attributes) to associate the bead with a virtual character which is a troll in the interactive software experience.

The hardware attributes may affect any behavior of the virtual entity; however, in various examples the hardware attributes may affect one or more of:

The appearance of the virtual entity in a virtual world within the interactive software experience;

Speech patterns/accent of the virtual entity (e.g. where the virtual entity is a virtual character);

Motion of the virtual entity (e.g. gait, mannerisms, etc.);

The type of the virtual entity (e.g. elf/gnome, male/female, etc.); and

Behavioral traits or overall characteristics of the virtual entity (e.g. strength, aggressiveness).

It will be appreciated that although FIG. 2 shows the hardware attributes being retrieved ahead of the virtual attributes, in various examples this may be performed the other way round (virtual attributes then hardware attributes) or substantially simultaneously.

At some point in time, the virtual entity may cease to be associated with the particular physical user device (e.g. smart bead). This may, for example, be at the end of the lifetime of the virtual entity (e.g. when it dies, is regenerated or otherwise ceases to exist), or when the virtual entity moves to a virtual-only existence (and is no longer associated with any physical user device) or when the virtual entity "moves" and is instead associated with a different physical user device. When this happens, the hardware attributes remain linked to the physical user device and are subsequently associated with another virtual entity which is associated with that physical user device, where this may be a newly created virtual entity or an existing virtual entity which is moving from one physical user device to another. This next virtual entity which is associated with a particular physical user device (e.g. the newly created virtual entity) may be considered the next generation of virtual entity even though the virtual entity may be of a same or different type to the previous virtual entity and even though the virtual entity may be moving between physical user devices and may not be newly created.

In contrast, if a virtual entity ceases to exist the virtual attributes do not carry forward to any newly created virtual entity which starts afresh within the interactive software experience, but are instead reset or deleted (block 207) e.g. a newly created virtual entity starts again within a game rather than continuing at a level where the previous virtual entity ceased to exist, even if the two virtual entities are associated with the same physical user device. The method shown in FIG. 2 is then repeated, with the hardware attributes for the newly created virtual entity being received/accessed (in block 202 or 203) and combined with virtual attributes (accessed in block 204 and which may now have default values for the new entity) to modify the behavior of the virtual entity (in block 206).

In various examples, the same hardware attributes may always be used to determine the behavior of an associated virtual entity (in block 206) and these hardware attributes may remain the same from generation to generation or alternatively, the hardware attributes may be updated when a virtual entity is regenerated or otherwise ceases to be associated with the physical user device. When updating the hardware attributes, the interactive software experience generates updated hardware attributes (block 208) and transmits these updated values or details of the changes made to the hardware attributes to the wearable device or wherever the hardware attributes are stored (block 210).

In other examples, the hardware attributes may (in addition or instead) change slowly over the lifetime of a virtual entity (whilst that virtual entity is associated with the physical user device). As with the changes on regeneration, the interactive software experience generates updated hardware attributes (e.g. as in block 208) and transmits these updated values or details of the changes made to the hardware attributes to the wearable device or other attribute store (e.g. as in block 210); however, the updates may be transmitted to the wearable device or other attribute store more frequently than when regeneration occurs.

Figure 3:
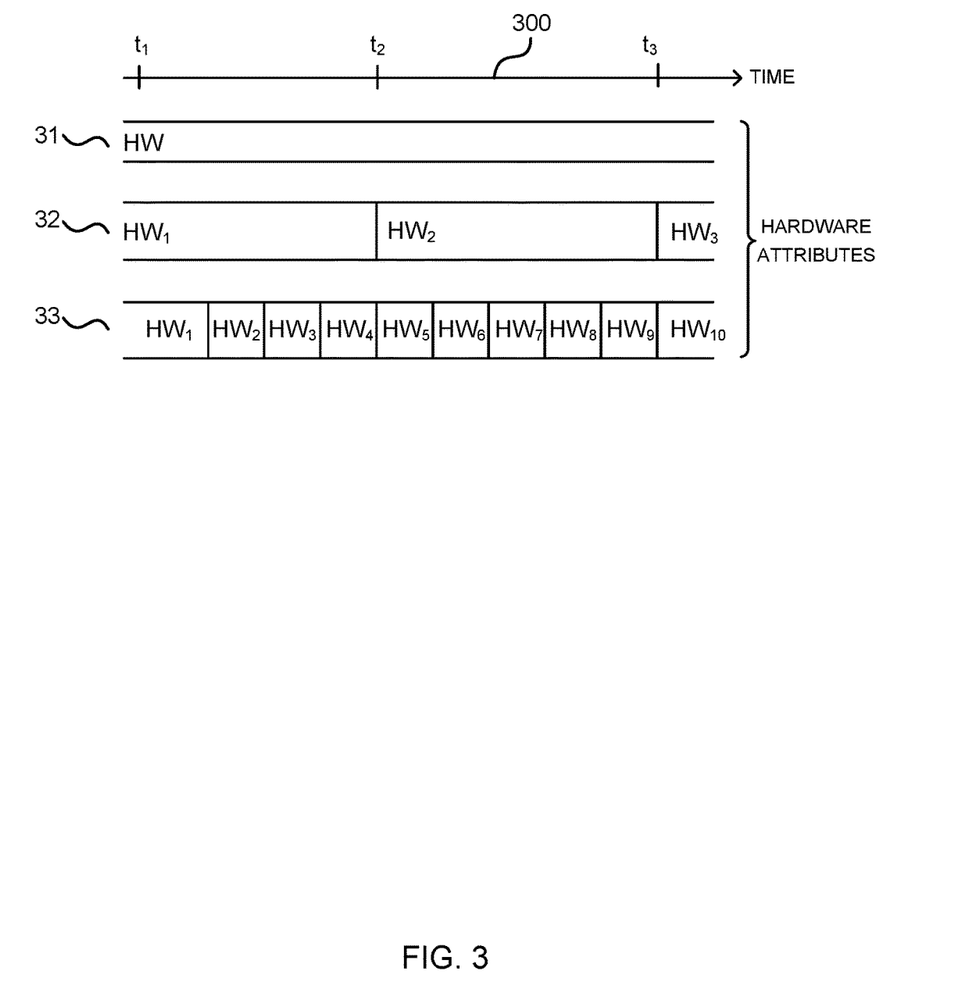
FIG. 3 is a schematic diagram showing when hardware attributes may be updated.

Examples of the updating of the hardware attributes are shown in FIG. 3. FIG. 3 shows a time line 300 with points $t_1$, $t_2$, $t_3$ where virtual entities are regenerated, such that a first virtual entity is created at time $t_1$ and ceases to exist (e.g. dies) at time $t_2$ to be replaced by a second virtual entity which ceases to exist (e.g. dies) at time $t_3$. In a first example 31, the hardware attributes (denoted HW) remain the same throughout the time line 300 and so whenever the behavior of the virtual entity is modified using the method shown in FIG. 2, the same value of hardware attributes (HW) is used. Furthermore, whenever the virtual entity is regenerated, the same value of hardware attributes (HW) is also used. It will be appreciated that over the time line the value of the virtual attributes will change at least at points $t_1$, $t_2$, $t_3$ (e.g. they will be reset when the virtual entity is regenerated) and in many examples will also change during the lifespan of any virtual entity.

In the second example 32, the hardware attributes are changed at the points $t_1$, $t_2$, $t_3$ where virtual entities are regenerated (e.g. from $HW_1$ to $HW_2$ at $t_2$) and so the same hardware attributes are always used for the same virtual entity whenever the behavior of the virtual entity is modified using the method shown in FIG. 2 (e.g. $HW_1$ for the first virtual entity, $HW_2$ for the second virtual entity and $HW_3$ for the third virtual entity). As described above, the value of the virtual attributes used when modifying behavior (in block 206) will change at least at points $t_1$, $t_2$, $t_3$ and in many examples also during the lifespan of any virtual entity.

In the third example 33, the hardware attributes are changed during the lifespan of a virtual entity (e.g. between $t_1$ and $t_2$) such that different hardware attributes may be used for a particular virtual entity when the behavior of the virtual entity is being modified using the method shown in FIG. 2. Although the third example shows discrete positions in time where the hardware attributes are changed (e.g. from $HW_1$ to $HW_2$) in other examples there may be a substantially continuous (but slow) change to the hardware attributes over time. In an example, the virtual attributes may be used to modify the hardware attributes in a slow averaging process.

Although FIG. 3 is described in terms of virtual entities which cease to exist at points $t_1$, $t_2$, $t_3$ on the time line 300, it may also be used to show changes to the hardware attributes where the virtual entity associated with a physical user device changes at points $t_1$, $t_2$, $t_3$ irrespective of whether this is due to a virtual entity ceasing to exist, moving to another physical user device, moving to a virtual-only phase, etc.

In various examples, the updates that are made to the hardware attributes (independent of when they are made) may be based on external factors (i.e. real world activities of the user) and/or factors within the interactive software experience. In various examples, a random subset of the hardware attributes may be carried forward from one generation to another (e.g. when the virtual entity is regenerated, the hardware attributes are updated and one or more of the hardware attributes are deleted or reset to a default value).

In various examples, the updates that are made to the hardware attributes (independent of when they are made) may be dependent on how well the user has looked after the virtual entity (in the interactive software experience) and the smart bead (in the real world). For example, the interactive software experience may set the user tasks to perform in the real and/or virtual world (where the virtual world is within the interactive software experience) and depending on whether these are performed and/or how well they are performed, the hardware attributes may be modified in different ways. In an example, if the tasks are performed well, the hardware attributes are modified so as to cause positive changes in behavior of the virtual entity and if the tasks are not performed or are performed badly, the hardware attributes are modified so as to cause negative changes in the behavior of the virtual entity. In an example, the tasks may require action in both the real world (with the smart bead, such as taking it to a particular location or doing a minimum amount of exercise) and the virtual world (with the virtual entity, such as completing a challenge in a virtual world).

When regeneration of a virtual entity occurs may be dependent on the particular interactive software experience. In some examples, a virtual entity may have a fixed lifetime in terms of a gameplay interval (e.g. 100 battles or 1000 minutes of gameplay) or a real world interval (e.g. 1 week). In other examples the lifetime may be variable in length and may be influenced by one or more different parameters (e.g. based on parameters within the interactive software experience, based on activities of the user in the real world and/or the virtual world, etc.). In further examples, a user may cause a first virtual entity to cease to be associated with a physical user device and a second virtual entity to instead be associated with the same physical user device (e.g. via controls in the interactive software experience).

In the examples described above, the interactive software experience modifies the behavior of a virtual entity based on the data identifying hardware attributes received from a single source (e.g. wearable device 102 or smart bead 110). In other examples, however, the interactive software experience may modify the behavior of a virtual entity based on data identifying hardware attributes received from multiple wearable devices and/or from multiple smart beads on the same wearable device. Each of these multiple wearable devices and/or multiple smart beads may be associated with the same virtual entity or alternatively, one of the multiple wearable devices/smart beads may be associated with the virtual entity and the other wearable devices/smart beads may provide their hardware attributes because they are in close proximity to the wearable device/smart bead that is associated with the virtual entity. This is shown graphically in FIG. 4.

Figure 4:
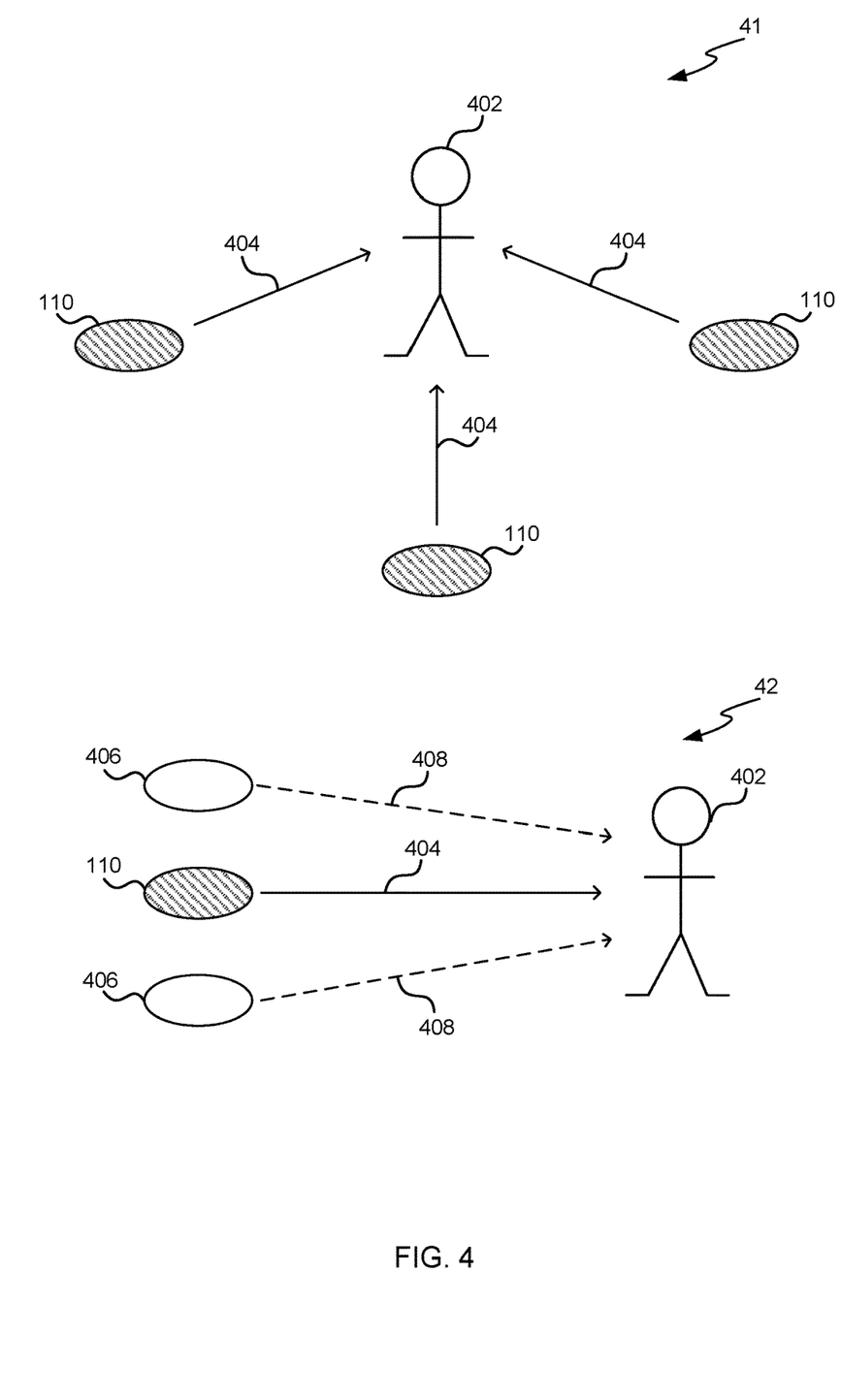
FIG. 4 is a schematic diagram showing the association between one or more smart beads and a virtual entity.

FIG. 4 shows two scenarios 41, 42 each of which comprise a virtual entity 402. In the first scenario 41, there are multiple smart beads 110 and each of the smart beads is associated with the virtual entity 402. The hardware attributes identified by data stored on each of the smart beads 110 affects the behavior of the virtual entity (as in block 206 of FIG. 2) as indicated by the arrows 404. The multiple smart beads 110 may be part of the same wearable device or different wearable devices (e.g. owned and/or worn by different users). In the second scenario 42, a single smart bead 110 is associated with the virtual entity 402 and the hardware attributes identified by data stored on that smart bead 110 affect the behavior of the virtual entity (as in block 206 of FIG. 2) as indicated by the arrow 404. The hardware attributes identified by data stored on one or more proximate smart beads 406 (i.e. proximate to smart bead 110) also affect the behavior of the virtual entity (as in block 206 of FIG. 2) as indicated by the dotted arrows 408. The proximate smart beads 406 may be part of the same wearable device as the smart bead 110, or they may be part of a proximate wearable device. Over time the smart beads which are proximate to smart bead 110 will change and so the hardware attributes which are used to modify the behavior of the virtual entity (in block 206 of FIG. 2) will also change.

In the examples described above, a single smart bead 110 or wearable device 102 is associated with one virtual entity. In various examples, however, a smart bead 110 (or wearable device or part thereof) may be associated with multiple virtual entities. Where a smart bead 110 is associated with multiple virtual entities, the same hardware attributes (identified by data stored in storage element 112) may be used for all of the associated virtual entities or the smart bead 110 may store (in storage element 112) data identifying multiple sets of hardware attributes (e.g. one per associated virtual entity or one for a subset of the associated virtual entities). As described above, the data identifying one or more hardware attributes may comprise the hardware attributes themselves (e.g. multiple sets of hardware attributes) or identifiers for hardware attributes (e.g. one or more identifiers which identify multiple sets of hardware attributes).

In some examples, the different virtual entities associated with a single smart bead may be independent of each other (e.g. they may not interact within the interactive software experience or they may be part of different interactive software experiences or different virtual worlds within the same interactive software experience). In other examples, the different virtual entities associated with a single smart bead may be interrelated (e.g. they may interact within a virtual world of the interactive software experience). In examples where interrelated virtual entities have different hardware attributes identified by data stored on the same smart bead, these different hardware attributes may influence the updating of hardware attributes for any one or more of the virtual entities (e.g. in block 208 of FIG. 2), e.g. there may be a slow averaging of the different sets of hardware attributes over time so that the different sets become more similar over time.

Figure 5:
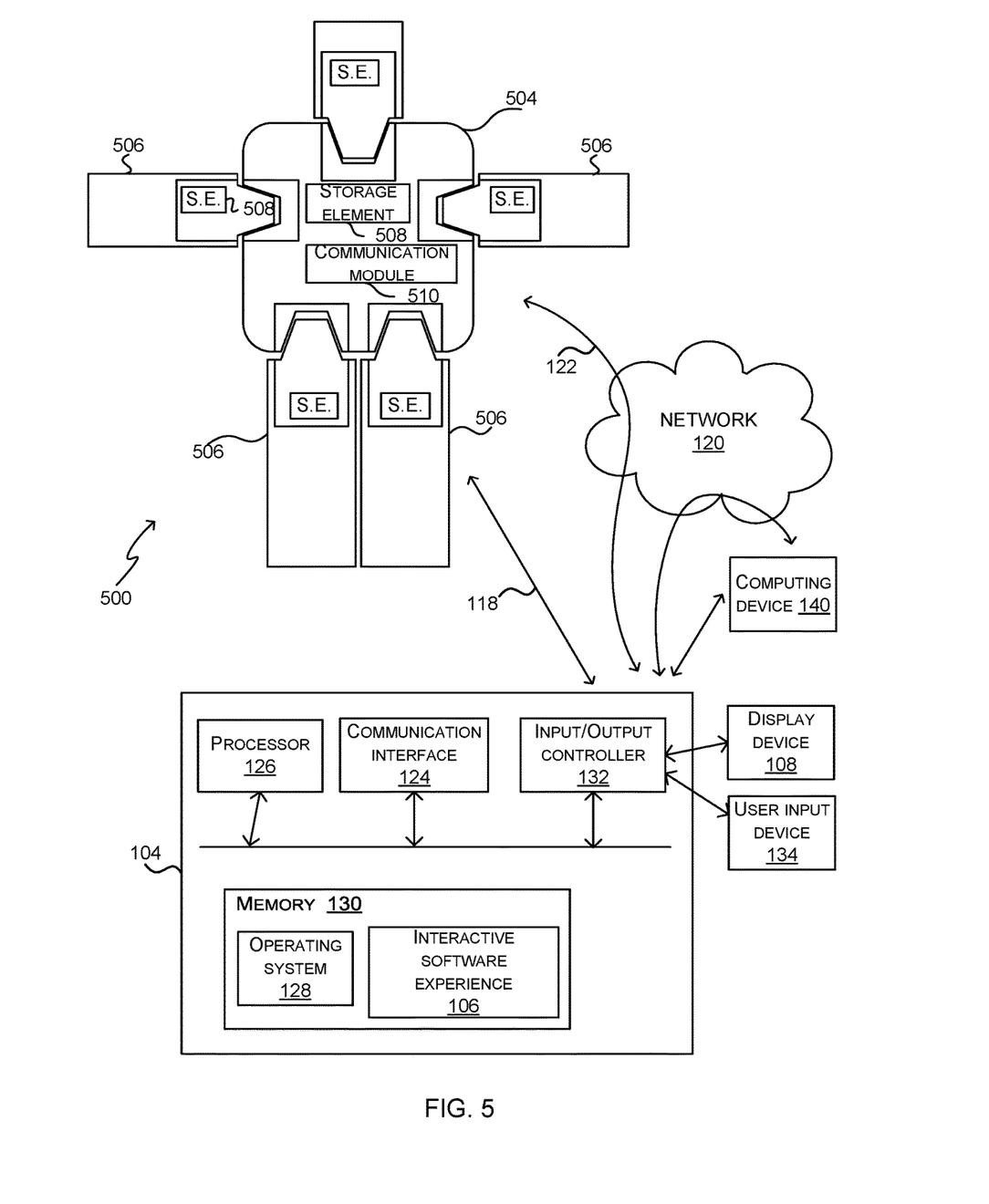
FIG. 5 is a schematic diagram of a system comprising a modular toy and a computing device on which an interactive software experience runs.

In the examples described above, the hardware attributes are identified by data stored on a wearable device or part thereof. However, the methods described herein are also applicable to other physical user devices or hardware tokens (e.g. game pieces) which are not wearable devices. FIG. 5 is a schematic diagram of a system 500 which is a variation on that shown in FIG. 1 and described above. Instead of comprising a wearable device 102 as in the system 100 in FIG. 1, the system 500 in FIG. 5 comprises a modular toy 502 (which may be a game piece). The system 500 further comprises a computing device 104 on which an interactive software experience 106 runs. The modular toy 502 comprises a core module 504 and a plurality of peripheral modules 506 and each module 504, 506 comprises a storage element 508. As shown in FIG. 5, the core module 504 further comprises a communication module 510 which is arranged to communicate with the computing device 104 which runs the interactive software experience 106.

The modular toy 502 or a part thereof (e.g. one of the modules 504, 506) is associated with a virtual entity within the interactive software experience (where, as described above, the virtual entity may be a character, object, etc.) and comprises a storage element 508 which is arranged to store data identifying one or more hardware attributes for the associated virtual entity. In the example shown in FIG. 5 each module comprises a storage element 508; however, in other examples only one of the modules (e.g. the core module 504) or a subset of the modules may comprise a storage element 508. In an example, each of the modules 504, 506 may be associated with the same virtual entity such that the behavior of that virtual entity is modified based on a combination of the virtual attributes for that entity and the hardware attributes identified by data stored in each of the modules 504, 506. In another example, each of the modules 504, 506 is associated with a part of the virtual entity (e.g. a leg module is associated with a leg of the virtual entity) and so the behavior of a part of the virtual entity is modified based on a combination of the virtual attributes for the virtual entity (or the specific part of the virtual entity) and the hardware attributes identified by data stored in the particular module which is associated with that part of the virtual entity.

In order that the interactive software experience 106 can receive the stored data identifying the hardware attributes (and potentially update that data, where the data comprises the hardware attributes themselves), the modular toy 502 comprises a communication module 510 arranged to communicate with the computing device 104 on which the interactive software experience runs. In the example shown in FIG. 5, the communication module 510 is located in the core module 502 and the communication module 510 is used to communicate the hardware attributes from any of the modules in the modular toy. In other examples, there may be communication modules within each module.

Any suitable wireless communication technology may be used by the communication module 510 to communicate with the interactive software experience 106, e.g. Bluetooth®, Bluetooth® Low Energy (BLE), WiFi™ or WiFi™ Direct, NFC, 802.15.4, etc. The communication module 510 may communicate directly with the computing device 104 running the interactive software experience 106 (arrow 118) or may communicate via a network 120 (e.g. a home network or the internet, arrow 122) and/or an intermediary device (e.g. a wireless access point or other computing device).

The computing device 104 which runs the interactive software experience 106 comprises a communication interface 124 which is arranged to receive data from the modular toy 502 (i.e. from communication module 510). As described above, any suitable wired or wireless communication technology may be used by the communication interface 124.

The computing device 104 which runs the interactive software experience 106 further comprises one or more processors 126 and a memory 130 which is arranged to store computer executable instructions for the interactive software experience 106 and also for an operating system 128. The computing device 104 may also comprise an input/output controller 132 (described above).

The modular toy 502 shown in FIG. 5 is formed from a plurality of physical modules which are each a sub-component of the coherent physical whole object (the toy). Once assembled, the coherent physical whole object is physically attached together to form a single object, i.e. requiring a deliberate action by the user to detach (e.g. an applied force to overcome a mechanical friction fit or a magnetic attachment holding the modules together, or an unclasping or threading action so that a module can be removed or disconnected from an adjacent module). This is in contrast to systems in which a module or modules are sensed to be near or touching one another, but no mechanical element holds them together (with the exception of gravity, if the whole assembly is only lifted vertically from underneath). The coherent physical whole object (i.e. toy 502) is moveable freely (e.g. in three dimensions) by a user and is capable of communicating with the interactive software experience while it is in motion. The coherent physical object (and/or the modules from which it is formed) may comprise mechanical articulation or movement affordances, e.g. it may have joints such as hinges, or some elements may be mobile compared to other elements, e.g. sliding or rotating with respect to one another.

In the system described herein, the same physical piece of hardware is associated with a sequence of virtual entities, one after the other, and these virtual entities (irrespective of the reason that they cease to be associated with a particular piece of hardware) may be considered to represent different generations of virtual entities. The interactive software experience in which the virtual entities exist may provide a GUI which enables a user to view the series of virtual entities that have been associated with a particular piece of hardware (e.g. a smart bead) over time. Such a GUI may enable a user to explore the sequence of virtual entities, e.g. by scrolling forwards and backwards in time to view the different virtual entities and/or to see how the hardware attributes have changed over time.

An example provides a method comprising: receiving, at a computing device from a physical user device, data identifying one or more hardware attributes for a virtual entity in an interactive software experience, the physical user device being associated with the virtual entity; accessing one or more virtual attributes for the virtual entity; and modifying one or more behaviors of the virtual entity within the interactive software experience based on a combination of the hardware and virtual attributes.

The physical user device may be a wearable device or a part thereof, such as a smart bead.

The virtual entity may be a virtual character.

The method may further comprise: associating a second virtual entity in the interactive software experience with the physical user device; receiving, at the computing device from the physical user device, data identifying one or more hardware attributes for the second virtual entity; accessing one or more virtual attributes for the second virtual entity; and modifying one or more behaviors of the second virtual entity within the interactive software experience based on a combination of the hardware and virtual attributes for the second virtual entity.

Additionally, the method may further comprise, in response to the virtual entity ceasing to exist: resetting the virtual attributes for virtual entity within the interactive software experience.

The method may further comprise: generating updated hardware attributes for the virtual entity; and transmitting updated hardware attributes to the physical user device or an attribute store.

The updated hardware attributes may be generated in response to the virtual entity ceasing to exist within the interactive software experience.

The updated hardware attributes may be generated using the virtual attributes for the virtual entity, based on real world activity of a user and/or based on tasks specified by the interactive software experience and performed by a user.

The method may further comprise: receiving, at the computing device from one or more additional physical user devices, data identifying further hardware attributes for the virtual entity, and wherein the modifying of one or more behaviors may be based on a combination of the hardware attributes, the further hardware attributes and the virtual attributes.

The one or more additional physical user devices may all be associated with the virtual entity or they may be in proximity to the physical user device which is associated with the virtual entity.

The method may be least partially carried out using hardware logic.

An example provides a system comprising a physical user device associated with an interactive software experience running on a separate computing device, the physical user device comprising: a storage element arranged to store data identifying a set of hardware attributes associated with a virtual entity within the interactive software experience; and a communication module arranged to communicate the data identifying the set of hardware attributes to the interactive software experience in order to modify one or more behaviors of the virtual entity within the interactive software experience.

The data identifying the set of hardware attributes may comprise the set of hardware attributes or an identifier for the set of hardware attributes. Where the data identifying the set of hardware attributes comprises an identifier for the set of hardware attributes, the hardware attributes may be stored in a remote attribute store.

The physical user device may be a wearable device comprising a smart bead attached to a connecting element. The smart bead may be associated with the virtual entity and may comprise the storage element.

The physical user device may be a modular toy formed from a plurality of modules.

An example provides one or more tangible device-readable media with device-executable instructions that, when executed by a computing system, direct the computing system to: access a set of hardware attributes for a virtual entity within an interactive software experience from a physical hardware device associated with the virtual entity; access a set of virtual attributes for the virtual entity; modify at least one aspect of the virtual entity based on a combination of the hardware and virtual attributes; and in response to the virtual entity ceasing to exist within the interactive software experience, to reset the virtual attributes and associate a second virtual entity with the physical hardware device and the set of hardware attributes.

The virtual attributes may be stored in the interactive software experience or an attribute store.

An example provides a physical user device associated with an interactive software experience running on a separate computing device, the physical user device comprising: a means for storing data identifying a set of hardware attributes associated with a virtual entity within the interactive software experience; and a means for communicating the data identifying the set of hardware attributes to the interactive software experience in order to modify one or more behaviors of the virtual entity within the interactive software experience.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
   identifying a virtual entity in an interactive software experience, wherein:
   the virtual entity has one or more virtual attributes that are managed within the interactive software experience; and
   the virtual entity is capable of one or more virtual behaviors, wherein an individual behavior is affected by one or more of the virtual attributes of the virtual entity;
   determining one or more hardware attributes for the virtual entity in the interactive software experience based at least on one or more corresponding hardware attributes stored by and associated with a physical user device, wherein each of the one or more hardware attributes for the virtual entity corresponds to one or more behavioral attributes of the virtual entity;
   modifying the individual behavior of the virtual entity within the interactive software experience based on a combination of the one or more hardware attributes and the one or more virtual attributes; and
   based on a user's performance of one or more tasks using the physical user device, generating updates for the one or more hardware attributes for the virtual entity during a first lifespan of the virtual entity, wherein the updates result in one or more changes to the one or more hardware attributes stored by and associated with the physical user device, wherein the one or more changes to the one or more hardware attributes:
   remain linked to the physical user device following the end of a first lifespan of the virtual entity,
   persist following a regeneration of the virtual entity between the first lifespan and a second lifespan of the virtual entity, and
   persist following association of the physical user device with a second virtual entity that is different from the virtual entity.

2. A method as recited in claim 1, wherein the physical user device is a wearable device or a part thereof.

3. A method as recited in claim 2, wherein the physical user device is a smart bead.

4. A method as recited in claim 1, wherein the virtual entity is a virtual character.

5. A method as recited in claim 1, further comprising:
   identifying the second virtual entity in the interactive software experience, the second virtual entity having a second set of one or more virtual attributes that are managed within the interactive software experience;
   associating the second virtual entity in the interactive software experience with the physical user device;
   determining one or more hardware attributes for the second virtual entity based at least on the hardware attributes associated with the physical user device; and
   modifying one or more behaviors of the second virtual entity within the interactive software experience based on a combination of the virtual attributes for the second virtual entity and the hardware attributes.

6. A method as recited in claim 5, further comprising, in response to the virtual entity ceasing to exist:
   resetting the virtual attributes for the virtual entity to default virtual attribute values within the interactive software experience.

7. A method as recited in claim 1, further comprising generating updated hardware attributes for the virtual entity, in response to the virtual entity ceasing to exist within the interactive software experience.

8. A method as recited in claim 1, further comprising:
   determining further hardware attributes for the virtual entity in the interactive software experience based at least on hardware attributes associated with one or more additional physical user devices,
   and wherein modifying one or more behaviors of the virtual entity in the interactive software experience is based on a combination of the hardware attributes, the further hardware attributes, and the virtual attributes.

9. A method as recited in claim 8, wherein the one or more additional physical user devices are also associated with the virtual entity.

10. A method as recited in claim 8, wherein the one or more additional physical user devices are in proximity to the physical user device which is associated with the virtual entity.

11. A method as recited in claim 1 at least partially carried out using hardware logic.

12. The method according to claim 1, wherein the one or more tasks are specified by the interactive software experience to require real world user activity using the physical user device that does not affect corresponding virtual behavior of the virtual entity.

13. The method according to claim 1, wherein the one or more tasks comprise a plurality of tasks that are specified by the interactive software experience, wherein:
   at least one of the plurality of tasks comprises a task requiring real world user activity using the physical user device that does not affect corresponding virtual behavior of the virtual entity, and at least one of the plurality of tasks comprises a task performed by the user using the physical user device to affect a corresponding virtual behavior of the virtual entity.

14. One or more computer storage media storing executable instructions that, when executed by a computing system, direct the computing system to:
   identify a virtual entity within an interactive software experience, the virtual entity having associated therewith:
      virtual attributes that are maintained within the interactive software experience; and
      behaviors, wherein one or more behaviors are affected based on the virtual attributes;
   determine a set of hardware attributes for the virtual entity within the interactive software experience based on stored data that identifies a hardware attribute associated with a physical hardware device, the hardware attribute mapping to a single behavioral attribute of the virtual entity;
   modify at least one behavior of the virtual entity based on a combination of the hardware attributes and the virtual attributes;
   based on a user's performance of one or more tasks using the physical hardware device, generating updates for at least one of the hardware attributes for the virtual entity during a first lifespan of the virtual entity, wherein the updates result in one or more changes to the hardware attribute stored by the physical hardware device, wherein the one or more changes to the hardware attribute persist to a second lifespan of the virtual entity;
   disassociate the physical user device from the virtual entity;
   associate a second physical user device with the virtual entity; and
   in response to at least one of the associating or the disassociating, no longer associate the changes to the hardware attribute with the virtual entity.

15. One or more computer storage media as recited in claim 14, wherein the stored data is stored on the physical hardware device.

16. One or more computer storage media as recited in claim 14, wherein the stored data is stored separate from the physical hardware device.

17. One or more computer storage media as recited in claim 16, wherein the physical hardware device stores an identifier that is associated with the stored data.

* * * * *